(12) United States Patent
Patra

(10) Patent No.: US 8,055,697 B2
(45) Date of Patent: Nov. 8, 2011

(54) METHOD AND DEVICE FOR DYNAMICALLY VERIFYING A PROCESSOR ARCHITECTURE

(75) Inventor: Priyadarsan Patra, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 894 days.

(21) Appl. No.: 12/057,623

(22) Filed: Mar. 28, 2008

(65) Prior Publication Data

US 2009/0248781 A1    Oct. 1, 2009

(51) Int. Cl.
*G06F 11/00* (2006.01)
(52) U.S. Cl. ........................................ 708/533
(58) Field of Classification Search .................. None
See application file for complete search history.

(56) References Cited

U.S. PATENT DOCUMENTS

| | | | |
|---|---|---|---|
| 4,994,993 A * | 2/1991 | Asghar et al. | 708/533 |
| 5,506,800 A * | 4/1996 | Dao-Trong | 708/531 |
| 5,880,982 A * | 3/1999 | Evans | 708/530 |
| 7,035,891 B2 * | 4/2006 | Makineni et al. | 708/530 |
| 2004/0044717 A1 * | 3/2004 | Makineni et al. | 708/530 |

OTHER PUBLICATIONS

Todd M. Austin "DIVA: A Reliable Substrate for Deep Submicron Microarchitecture Design" Proceedings of the 32nd annual ACM/IEEE international symposium on Microarchitecture , 1999.
Todd M. Austin "DIVA: A Dynamic Approach to Microprocessor Verification" Journal of Instruction-Level Parallelism 2 (2000).
R. E. Lyons, W. Vanderkulk "The Use of Triple-Modular Redundancy to Improve Computer Reliability" vol. 6, No. 2, pp. 200-209 (Apr. 1962) Nontopical Issue.
Eric Rotenberg, "AR-SMT: A Microarchitectural Approach to Fault Tolerance in Microprocessors", Twenty-Ninth Annual International Symposium on Fault-Tolerant Computing, 1999.

* cited by examiner

*Primary Examiner* — David H Malzahn
(74) *Attorney, Agent, or Firm* — Schawbe, Williamson & Wyatt, P.C.

(57) ABSTRACT

A method and device may be useful for dynamically verifying a processor architecture at runtime. The checker may more efficiently and cheaply verify at least some of the functionality provided by the execution unit of the processor architecture. The checker may verify operations such as addition, subtraction, multiplication, and division.

16 Claims, 6 Drawing Sheets

METHOD AND DEVICE FOR DYNAMICALLY VERIFYING A PROCESSOR ARCHITECTURE

BACKGROUND

1. Technical Field

Embodiments of the present invention relate to a dynamic verification method and device for a processor architecture. More specifically, embodiments of the present invention relate to a dynamic verification method and device for a processor architecture which more efficiently verifies at least some of the functionality provided by the execution (EXE) unit of the processor architecture.

2. Description of the Related Art

Modern processors face growing verification and reliability challenges. These challenges are posed by increasing system micro-architecture complexity (i.e., the increasing number of transistors) and aggressive technology scaling (i.e., the decreasing size of transistors). It is becoming increasingly impossible to catch all processor design bugs in pre-silicon verification. At the same time, post-silicon verification cost is ballooning. Moreover, technology scaling leads to hardware that is more vulnerable to run-time errors post-deployment such as aging, environmentally induced hard errors, transients, and intermittent failures. "Verification" may refer to the process of determining whether a processor design is correct. Verification may be performed by a hardware-based and/or software-based checker. A "checker" is a device or method which checks for correctly executed results at runtime. If the checker is hardware-based, it may be a processor, controller, or the like. Alternatively, it may be a functional unit in a processor, controller, or the like. This approach is traditionally used when full-bit checking and correction are demanded.

To provide resilient and fault-tolerant computing, designers have adopted various techniques such as:

i. Spatial replication: An odd number of redundant modules all compute an instruction and produce a result. A voting mechanism is then employed to pick the majority result. An example of spatial replication is Triple-Modular Redundancy (R. E. Lyons and W. Vanderkulk: The use of Triple-Modular Redundancy to Improve Computer Reliability. IBM Journal. April 1962).

ii. Temporal replication: The same module is used to compute (and re-compute) an instruction and produce a result an odd number of times. A voting mechanism is then employed to pick the majority result. An example of temporal replication is AR-SMT (Eric Rotenberg: AR-SMT: A Microarchitectural Approach to Fault Tolerance in Microprocessor. Proceedings of Fault-Tolerant Computing Systems (FTCS). 1999).

iii. Coding: Error detecting codes such as parity bits or residue bits are employed to detect computation errors up to a certain number of bit errors. Error correcting codes may also be employed.

iv. Adaptive clocking and/or supply: The same module is used to compute (and re-compute) an instruction and produce a result an odd number of times using different voltages and/or clock frequencies. A voting mechanism is then employed to pick the majority result.

A more recent approach is DIVA (T. M. Austin: DIVA: A Dynamic Approach to Microprocessor Verification. Journal of Instruction-Level Parallelism. May 2000. and T. M. Austin: DIVA: A Reliable Substrate for Deep Submicron Microarchitecture Design. In Proceedings of the 32nd Annual ACM/IEEE International Symposium on Microarchitecture, IEEE Computer Society, Haifa, Israel, 196-207. 1999) in which a checker computes an instruction and produces a result. The checker is simpler (i.e., less complex) than the processor it is meant to check. The result from the checker is then compared to the result from the complex core processor for equality before the complex core result is committed. Even though the checker is far simpler than the core processor, the checker is nonetheless an additional, redundant execution unit. Therefore, DIVA-type approaches end up duplicating or re-implementing a substantial amount of logic such as, for example, the Arithmetic Logic Units (ALUs) in the Execution (EXE) unit.

BRIEF DESCRIPTION OF THE DRAWINGS

The subject matter disclosed in this application is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings in which:

DETAILED DESCRIPTION

Figure 1:
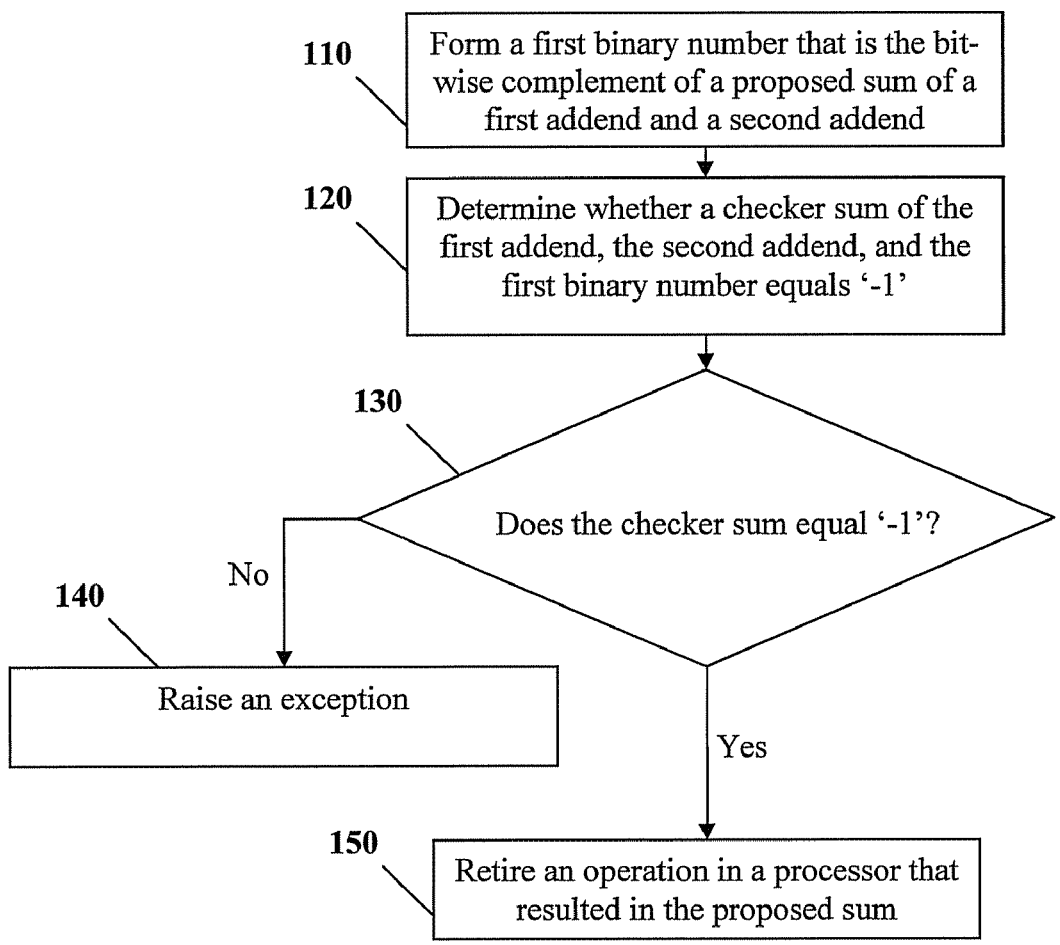
FIG. 1 shows a flowchart of a first method for determining whether to retire an operation in a processor that results in a proposed sum according to an embodiment of the present invention.

In the following description, various aspects of the present invention will be described. For purposes of explanation, specific configurations and details are set forth in order to provide a thorough understanding of the present invention. However, it will be apparent to one skilled in the art that the present invention may be practiced without the specific details presented herein. Furthermore, well-known features may be omitted or simplified in order not to obscure the present invention. Various examples are given throughout this description. These are merely descriptions of specific embodiments of the invention. The scope of embodiments of the present invention is not limited to the examples given.

Unless specifically stated otherwise, as apparent from the following discussions, it is appreciated that throughout the specification, discussions utilizing terms such as "processing," "computing," "calculating," "determining," or the like, refer to the action and/or processes of a processor, processor or processing system, or similar electronic computing device, that manipulates and/or transforms data represented as physical, such as electronic, quantities within the processing system's registers and/or memories into other data similarly represented as physical quantities within the processing system's memories, registers or other such information storage, transmission or display devices.

The processes and displays presented herein are not inherently related to any particular processor, computer, communication device or other apparatus. The desired structure for a variety of these systems will appear from the description below. In addition, embodiments of the present invention are not described with reference to any particular programming language, machine code, logic circuit, etc. It will be appreciated that a variety of programming languages, machine codes, logic circuit, etc. may be used to implement the teachings of the invention as described herein.

Embodiments of the present invention may include apparatus for performing the operations herein. This apparatus may be specially constructed for the desired purposes, or it may comprise a general purpose processor selectively activated or reconfigured by a program stored in the processor. Such a program may be stored in a processor readable storage medium, such as, but is not limited to, any type of disk including floppy disks, optical disks, magnetic-optical disks, read-only memories, compact disc read-only memories, random access memories, electrically programmable read-only memories, electrically erasable and programmable read only memories, magnetic or optical cards, or any other type of media suitable for storing electronic instructions, and capable of being coupled to a processor system bus.

The inventor has discovered that a significantly more efficient approach to verification may be achieved through the realization that given a number triple (a, b, c) and an operator op, a checker which verifies whether c equals a op b is no more complex than a checker that computes a op b and compares the result with c. For example, a checker that verifies whether c equals a*b is no more complex than a checker that multiplies a times b and compares the resultant product with c to verify if c is correct.

The inventor has found that building a checker to compute a op b, which is akin to synthesis/optimization, is no more complex than building a checker to compute c==a op b, which is akin to verification. Thus, the cost of verifying a function is no more expensive than the cost of correctly implementing the function. This methodology is first illustrated by demonstrating how a checker for the addition operation can be made less complex and more energy efficient.

In the prior art, in order to check that a first ALU correctly computes a+b=c, a second ALU is built to compute a+b. The outputs of the first ALU to the second ALU for then compared to check for equality. In this approach, the executing-checking paradigm is more than 100% costlier (i.e., more complex) than an unverified/unchecked implementation.

In embodiments of the present invention, a checker for the operation of addition receives a binary number triple (a, b, c) in which a and b are a first addend and a second addend, respectively, and c is the proposed sum. The proposed sum may be the result of an operation in a processor, where the number c has been computed by an ALU or processor. One or more of the first added, the second addend, and the proposed sum may be two's complement numbers. It should be noted that the numbers a, b, and c may be any format a computing system may use to represent numbers. In embodiments of the present invention, the numbers may be converted to two's complement if they are in a different format. The number c may be bit-wise complemented to obtain the number c'. In a bit-wise complement operation, every bit of a binary number may be inverted such that the bit-wise complement of the binary number 01101 is 10010, for example. The bit-wise complement operation may be performed by a bit-wise complement logic 720.

The numbers a, b, and c' may be added together by an adder 750 (e.g., by a full adder) to produce a checker sum. If it is determined that the checker sum is equal to −1, the proposed sum c may be verified as correct. A determining logic 710 may be used to determine whether the checker sum is equal to −1. If the numbers a, b, and c' are two's complement numbers, the determining logic may determine whether the checker sum is equal to −1 in two's complement (i.e., all 1's). If the determining logic determines the checker sum is equal to −1, the operation in the processor may be retired. The operation may be retired and/or committed by a commit logic 730.

The following is a brief proof of the checker for the addition operation described above:

i. Assume that the proposed sum, c, is the correct answer to the operation a+b.
ii. Thus, a+b−c must equal 0.
iii. In two's complement arithmetic, if the numbers are n bits wide −c=$2^n$−c=c'+1 (where c' is the bit-wise complement of c).
iv. Thus, a+b+c'+1 must equal 0.
v. Thus, a+b+c' must equal −1. Alternatively, a+b+c'=1111 . . . since −1 is a string of all-ones in two's complement form.

In an alternative embodiment of the present invention, numbers a, b, and c' may not be added together as described above. Instead, corresponding bits of a, b, and c' may be single-bit added to obtain a Sum number and a Carry number. In a single-bit addition operation the $i^{th}$ bit of three numbers, such as a, b, and c', are added together to produce a checker sum. The least significant bit of the checker sum is stored as $Sum_i$ and the most significant bit of the checker sum is stored as $Carry_i$. Thus, single-bit addition may be a type of 3 to 2 bit-wise compression. The single-bit addition operation may be performed by one or more single-bit adders 760 (e.g., by a half adder).

To clarify, a truth table for single-bit addition is shown in Table I.

TABLE I

| $a_i$ | $b_i$ | $c_i$ | $Carry_i$ | $Sum_i$ |
|---|---|---|---|---|
| 0 | 0 | 0 | 0 | 0 |
| 0 | 0 | 1 | 0 | 1 |
| 0 | 1 | 0 | 0 | 1 |
| 0 | 1 | 1 | 1 | 0 |
| 1 | 0 | 0 | 0 | 1 |
| 1 | 0 | 1 | 1 | 0 |
| 1 | 1 | 0 | 1 | 0 |
| 1 | 1 | 1 | 1 | 1 |

As can be seen from Table I, the pair Carry and Sum satisfy the condition that for the $i^{th}$ bit, $2*Carry_i+Sum_i=a_i+b_i+c'_i$. It is important to note, that there is no "carry in" bit in the single-bit addition of a, b, and c', i.e. the carry bit is stored in Carry and not propagated. Thus, because each single-bit addition of the corresponding bits of a, b, and c' is done in isolation, the single-bit additions may be conducted in parallel which is faster and more efficient. If the proposed sum is correct, the following two conditions will be true:

i. The least significant bit (i.e., the $0^{th}$ bit) of Sum is 1 ($Sum_0=1$); and
ii. For the remaining Sum bits $Carry_i \neq Sum_{i+1}$ (i equals 0 to n−1, where n is number of bits in Carry and Sum).

Thus, if the proposed sum is correct, the least significant bit of Sum equals 1 and each bit in Carry does not equal the next most significant bit of Sum. A determining logic 710 may be used to determine whether the two conditions are true. As will be shown below, if these two conditions are true, a+b+c' equals −1 as in the embodiment described above. Thus, the two methods are mathematically identical.

As an example, a equals 010110, b equals 001101 and the proposed sum from the processor or ALU, c, equals 101011. The checker's bit-wise complement logic 720 computes the bit-wise complement of c to obtain c' which is 010100. The checker's one or more single-bit adders 760 then perform a single-bit addition for the corresponding bits of a, b, and c'. The results of the single-bit addition can be found in Table II.

TABLE II

|  | Number | | | | | |
| --- | --- | --- | --- | --- | --- | --- |
|  | i = 5 | i = 4 | i = 3 | i = 2 | i = 1 | i = 0 |
| a | 0 | 1 | 0 | 1 | 1 | 0 |
| b | 0 | 0 | 1 | 1 | 0 | 1 |
| +c' | 0 | 1 | 0 | 1 | 0 | 0 |
| = | | | | | | |
| Sum | 0 | 0 | 1 | 1 | 1 | 1 |
| Carry | 0 | 1 | 0 | 1 | 0 | 0 |

The least significant bit of Sum is 1 ($Sum_0=1$), but $Carry_2$ equals $Sum_3$ so the proposed sum c is incorrect. Because c is incorrect, an exception may be raised, the operation in the processor may not be committed, and/or the addition operation may not be retired. The exception may be raised by an exception logic 740. On the other hand, if the proposed sum from the processor or ALU, c, is 100011, then Sum equals 000111 and Carry equals 011100. In this case, the above two conditions are satisfied. Therefore, c is verified as correct and the operation in the processor may be committed and/or retired.

The following is a brief proof of the checker for the addition operation described above:
  i. Assume that the proposed sum, c, is the correct answer to the operation a+b.
  ii. Thus, a+b−c must equal 0.
  iii. In two's complement arithmetic, if the numbers are n bits wide $-c=2^n-c=c'+1$ (where c' is the bit-wise complement of c).
  iv. Thus, a+b+c'+1 must equal 0.
  v. Thus, a+b+c' must equal −1. Alternatively, a+b+c'= 1111 . . . since −1 is a string of all-ones in two's complement form.
  vi. If there is a bit-error in the proposed sum c, the bit-wise complement c' will have errors in the exact same bit positions (assuming the bit-wise complement logic 720 is error-free).
  vii. Perform a single-bit addition of a+b+c' and store the results in Sum and Carry. In single-bit addition $2*Carry_i+Sum_i=a_i+b_i+c'_i$.
    a) If $Sum_0$ equals 0 then $a_0+b_0+c'_0$ must equal 00 or 10 and the least significant bit of a+b+c' would not equal 1. Therefore, a+b+c' wouldn't equal −1 and the proposed sum, c, would be incorrect.
    b) If $Carry_i$ equals $Sum_{i+1}$ then $2*Sum_{i+1}+Sum_i$ equals $a_i+b_i+c'_i$. Assume $Sum_{i+1}$ and $Carry_i$ equal 0. Then for the next bit, $2*Carry_{i+1}+Sum_{i+1}$ equals $a_{i+1}+b_{i+1}+c'_{i+1}$. Since $Sum_{i+1}$ equals 0, $a_{i+1}+b_{i+1}+c'_{i+1}$ must equal 00 or 10. But, since $Carry_i$ equals 0 it is not possible for the i+1 bit position of a+b+c' to equal 1 and thus a+b+c' does not equal −1. Assume $Sum_{i+1}$ and $Carry_i$ equal 1. Since $Sum_{i+1}$ equals 1, $a_{i+1}+b_{i+1}+c'_{i+1}$ must equal 01 or 11. But, since $Carry_i$ equals 1 it is not possible for the i+1 bit position of a+b+c' to equal 1 and thus a+b+c' does not equal −1.
    c) Therefore, for the proposed sum, c, to be correct $Sum_0$ must equal 1 and $Carry_i \neq Sum_{i+1}$.

This proof may be more formally shown by induction on the number of bits, n, of the binary numbers involved; the base case of single-bit numbers is trivial to show. It should be noted from the above proof, that the determination of whether the two aforementioned conditions are true (i.e., that the least significant bit of Sum equals 1 and that for the remaining Sum bits $Carry_i \neq Sum_{i+1}$) is the same as determining whether a+b+ c' equals −1.

The relationship $Carry_i \neq Sum_{i+1}$ may be checked by a determining logic 710 (where i=0 . . . n−1, and Carry and Sum are n-bit numbers). The determining logic may be a 2-bit exclusive-or gate. The exclusive-or gate only outputs a '1' if the relationship $Carry_i \neq Sum_{i+1}$ is true. A large NAND gate having n inputs may then be implemented in which the $i^{th}$ input to the NAND gate is the output of the 2-bit exclusive-or gate which checks $Carry_i \neq Sum_{i+1}$. The NAND gate will output a '0' only when the proposed result c is correct.

It is important to note that because the numbers a, b, and c are two's complement numbers, embodiments of the present invention may be used to verify subtraction operations as well.

FIG. 1 shows a flowchart of a first method for determining whether to retire an operation in a processor that results in a proposed sum according to an embodiment of the present invention. The method may begin in operation 110 in which a first binary number may be formed. The first binary number may be the bit-wise complement of a proposed sum. The proposed sum may be the result of an operation in a processor. The proposed sum may be proposed by an ALU or processor as the sum of a first addend and a second addend. The first addend, the second addend, and the proposed sum may be two's complement numbers. The method may continue to operations 120 and 130 in which it is determined whether a checker sum is equal to '−1' in two's complement. The checker sum may be the sum, produced by the checker, of the first addend, the second addend, and the first binary number. If the checker sum equals '−1', the method may continue to operation 150 in which the operation in the processor that resulted in the proposed sum is retired. The results of the operation may be committed. If the checker sum does not equal '−1', the method may continue to operation 140 in which an exception may be raised. The operation in the processor that resulted in the proposed sum may not be retired and/or the results of the operation may not be committed.

Figure 2:
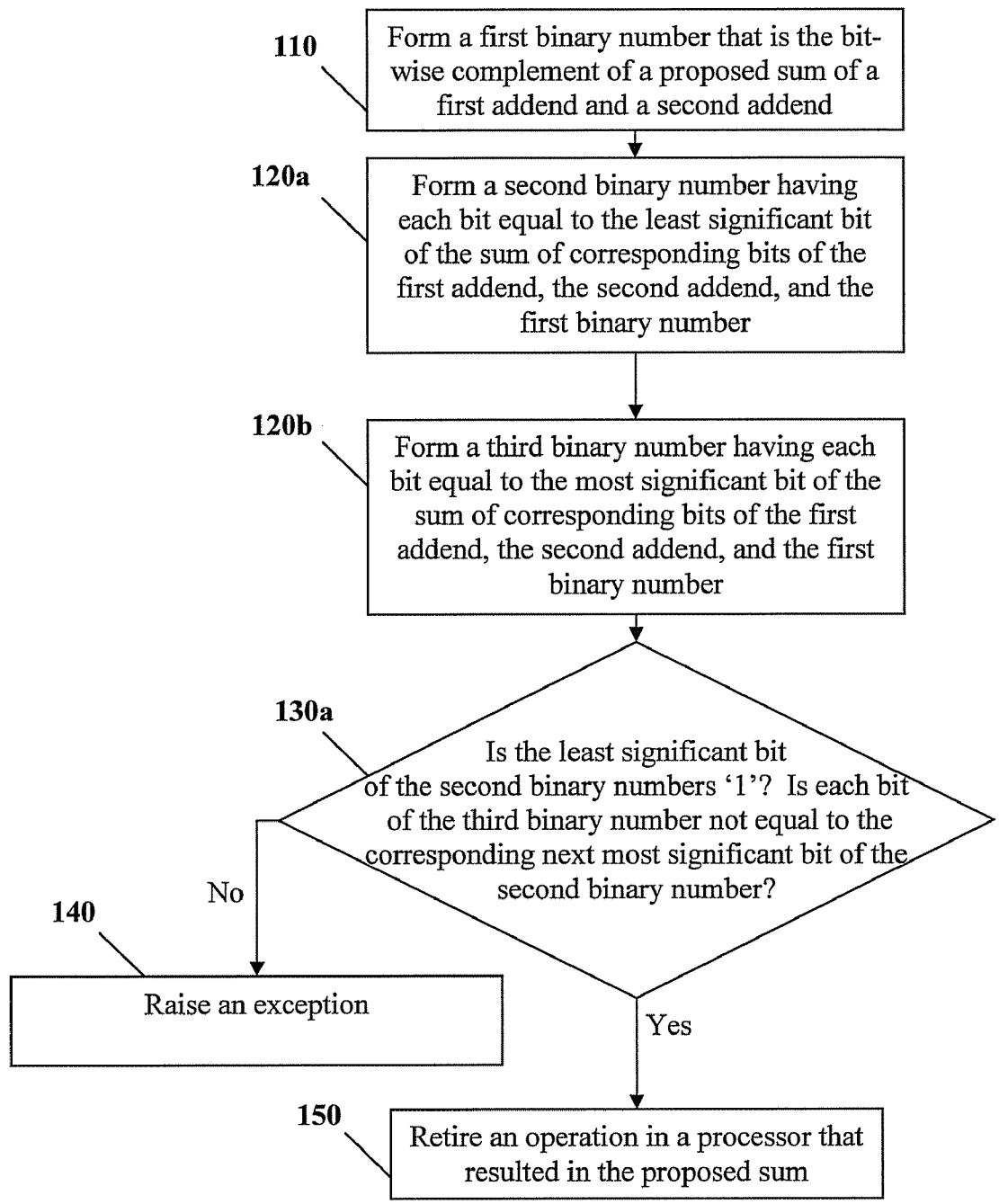
FIG. 2 shows a flowchart of a second method for determining whether to retire an operation in a processor that results in a proposed sum according to an embodiment of the present invention.

FIG. 2 shows a flowchart of a second method for determining whether to retire an operation in a processor that results in a proposed sum according to an embodiment of the present invention. The method may begin in operation 110 as above. The method may continue to operations 120a, 120b, and 130a which are comparable operations to operations 120 and 130 above. In operation 120a, a second binary number may be formed. Each bit of the second binary number may be equal to the least significant bit of the sum of corresponding bits of the first addend, the second addend, and the first binary number. In operation 120b, a third binary number may be formed. Each bit of the third binary number may be equal to the most significant bit of the sum of corresponding bits of the first addend, the second addend, and the first binary number. In operation 130a, it may be checked whether the least significant bit of the second binary number is '1' and whether each bit of the third binary number is not equal to the corresponding next most significant bit of the second binary number. If both conditions of operation 130a are true, the method may continue to operation 150 as above. If either or both both conditions of operation 130a are not true, the method may continue to operation 140 as above.

Figure 3:
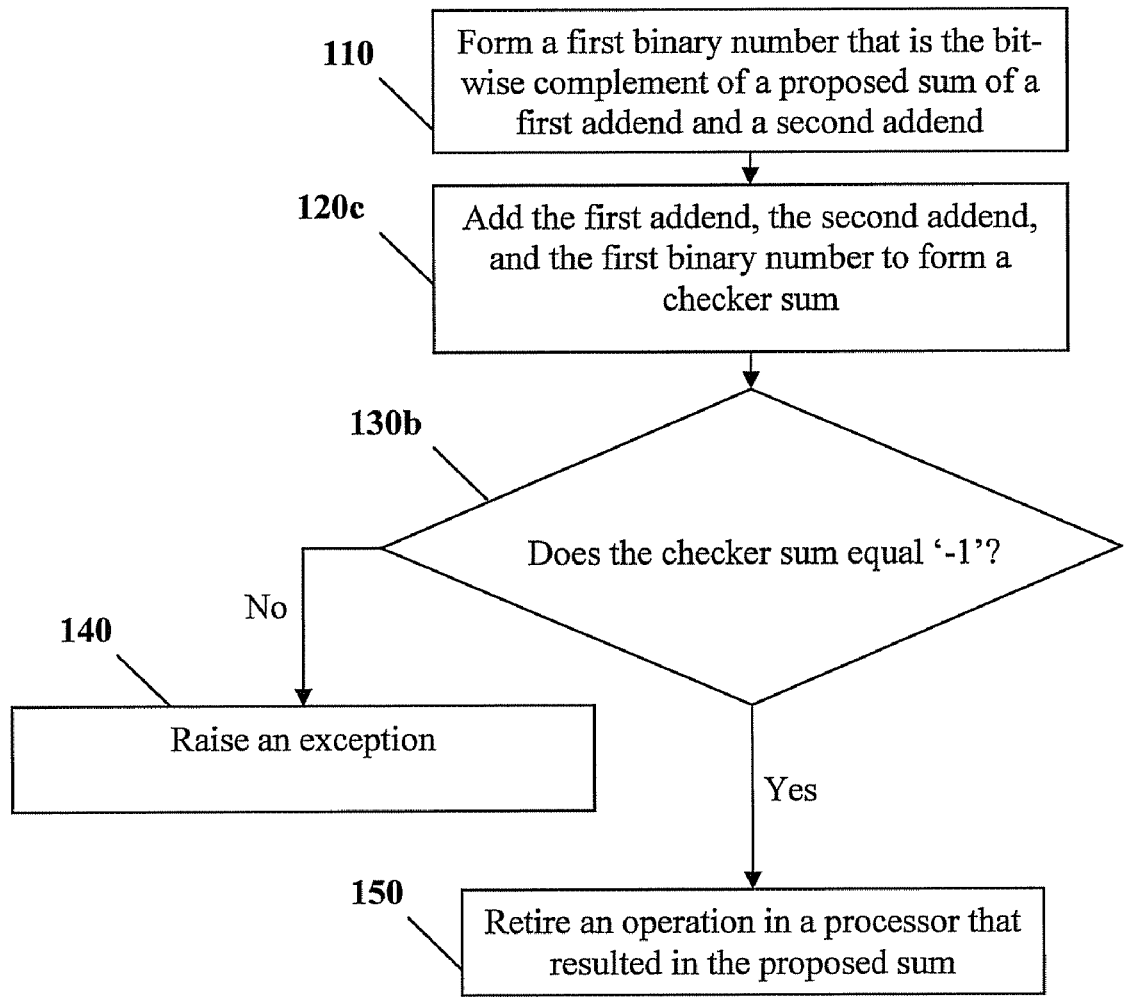
FIG. 3 shows a flowchart of a third method for determining whether to retire an operation in a processor that results in a proposed sum according to an embodiment of the present invention.

FIG. 3 shows a flowchart of a third method for determining whether to retire an operation in a processor that results in a proposed sum according to an embodiment of the present invention. The method may begin in operation 110 as above. The method may continue to operations 120c and 130b which are comparable operations to operations 120 and 130 above. In operation 120c, the first addend, the second addend, and the first binary number may be added together to form a checker sum. In operation 130b, it may be determined whether or not the checker sum equals '−1'. If the checker sum equal '−1', the method may continue to operation 150 as above. If the checker sum does not equal '−1', the method may continue to operation 140 as above.

Figure 7:
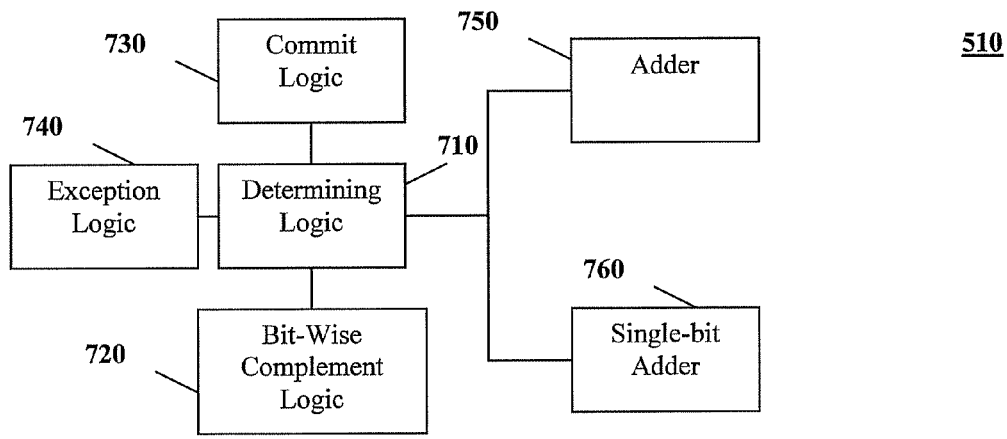
FIG. 7 shows a checker according to an embodiment of the present invention.

FIG. 7 shows a checker 510 according to an embodiment of the present invention. The checker may have a determining logic 710. The determining logic may be operably connected to a bit-wise complement logic 720. The determining logic may be operably connected to a commit logic 730. The determining logic may be operably connected to an exception logic 740. The determining logic may be operably connected to an adder 750. The determining logic may be operably connected to a single-bit adder 760. Alternatively, the determining logic may comprise the adder and/or the single-bit adder.

Embodiments of the present invention may also be used to verify multiplication operations. Typically, the final step in a multiplication operation is summing partial products. The method and device described above may be used to verify that a list of partial products add up to the correct product. For example, using 6 bit numbers, a equals 000111, b equals 000011 and the proposed product from the processor or ALU, c, equals 010100. In order to verify if c is correct, the checker may check if the partial products ($pp_i$) from the multiplication operation sum to equal c. Thus, the inputs to the checker may be the partial products and the proposed product, not the multiplicands a and b. Using a simple "shift and add" multiplication method, the partial products are listed below in Table III. The partial products are represented as 6 bit numbers for simplicity.

TABLE III

| | Number | | | | | |
|---|---|---|---|---|---|---|
| | i = 5 | i = 4 | i = 3 | i = 2 | i = 1 | i = 0 |
| a | 0 | 0 | 0 | 1 | 1 | 1 |
| *b | 0 | 0 | 0 | 0 | 1 | 1 |
| = | | | | | | |
| $pp_1$ | 0 | 0 | 0 | 1 | 1 | 1 |
| $PP_2$ | 0 | 0 | 1 | 1 | 1 | 0 |
| $pp_3$ | 0 | 0 | 0 | 0 | 0 | 0 |
| $pp_4$ | 0 | 0 | 0 | 0 | 0 | 0 |
| $pp_5$ | 0 | 0 | 0 | 0 | 0 | 0 |
| $+pp_6$ | 0 | 0 | 0 | 0 | 0 | 0 |

The proposed product from the multiplier, c, may be bit-wise complemented to obtain c' (in this example, c' equals 101011). The checker may then perform a single-bit addition of the partial products and c' to obtain Sum and Carry. As above, if the proposed product is correct, the least significant bit of Sum will be 1 ($Sum_0=1$) and for the remaining Sum bits $Carry_i \neq Sum_{i+1}$. This verification step is detailed in Table IV ($PP_3$-$PP_6$ are omitted since they are all-zeros).

TABLE IV

| | Number | | | | | |
|---|---|---|---|---|---|---|
| | i = 5 | i = 4 | i = 3 | i = 2 | i = 1 | i = 0 |
| $pp_1$ | 0 | 0 | 0 | 1 | 1 | 1 |
| $PP_2$ | 0 | 0 | 1 | 1 | 1 | 0 |
| +c' | 1 | 0 | 1 | 0 | 1 | 1 |
| = | | | | | | |
| Sum | 1 | 0 | 0 | 0 | 1 | 0 |
| Carry | 0 | 0 | 1 | 1 | 1 | 1 |

The least significant bit of Sum is 0 ($Sum_0=0$) and $Carry_0=Sum_1$ so the proposed product c is incorrect. Because c is incorrect, an exception may be raised, the operation in the processor may not be committed, and/or the multiplication operation may not be retired. On the other hand if the proposed product from the multiplier, c, is 010101, then Sum equals 100011 and Carry equals 001110 which satisfies the above two conditions. Therefore, c is verified as correct and the operation in the processor may be committed and/or retired. It should be noted that when the proposed product is found to be incorrect it may not be possible to ascertain which partial product is incorrect. Additionally, it is possible, although unlikely, for one or more partial products and/or the proposed product to be incorrect in such a manner that the confluence of the incorrect bits results in the checker erroneously indicating that the proposed product is correct.

In the event that there are more than two partial products, the partial products may be compressed using known methods. For example, there are known compressor circuits that may be used to compress four numbers into two equivalent numbers to be added. Alternatively, the partial products may be divided into manageable sets. For example, four numbers can be divided into two sets of two partial products each. Each set could be individually summed and the checker may then be used to check the addition of the sum of each set.

Figure 4:
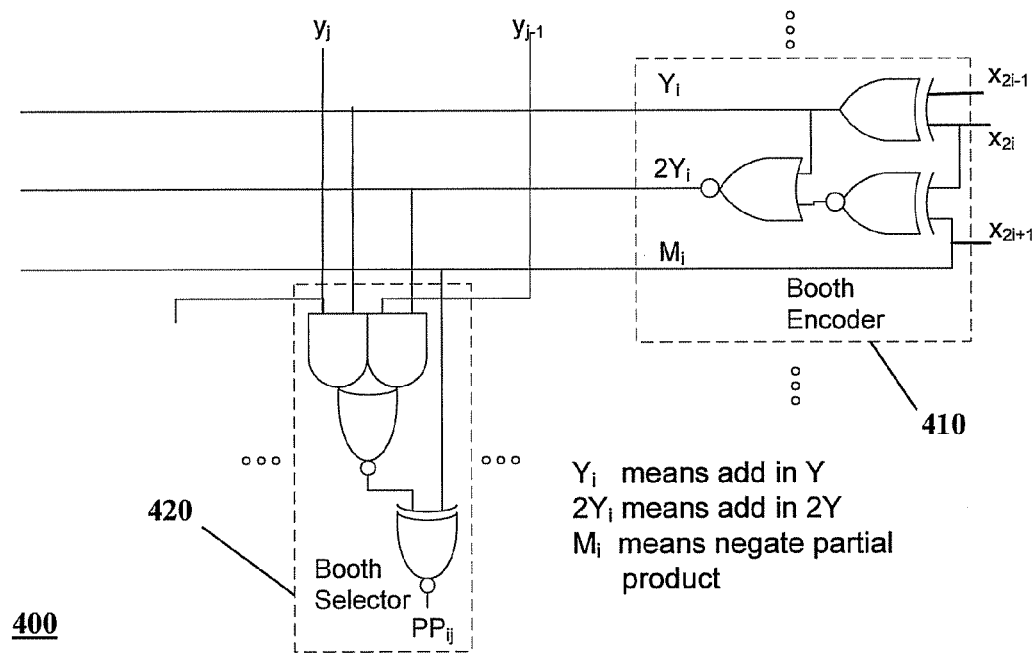
FIG. 4 shows a Booth multiplier according to an embodiment of the present invention.

In embodiments of the present invention, the multiplication operation may be implemented with Booth encoding in which the number of partial products is reduced using 3:2 or 4:2 compressors. These encoded partial products may then be added together to form the product of the multiplication. This last step is often complex and determines the circuit speed. FIG. 4 shows a Booth multiplier 400 according to an embodiment of the present invention. The Booth multiplier may have one or more Booth Encoders 410 and Booth Selectors 420 which may encode the partial products and select these partial products to be added together to obtain a product. The partial products may be added recursively, such that the last step comprises adding two final partial products. The checker may then be directly applied to this last step to verify if the final partial products sum to the proposed product from the processor or ALU.

It is important to note that this technique extends to verification of a division operation, since division checking can be performed by comparing the dividend to the results of multiplying the divisor and quotient and adding the remainder. Embodiments of the present invention may be useful in any operation involving a step of addition such as an operation which jumps or branches a given distance from the current program counter or addition over elliptic curves which is common in cryptographic engines.

Embodiments of the present invention may potentially be significantly simpler than the main processor core and may have applications in areas from resilient architecture to speeding up some functions within a core. By exploiting the inherent property of addition, a faster carry-free checker for operations such as addition, subtraction, multiplication, and division may be built. Thus, the checker core in architectures such as DIVA may be made much more cost-effective.

Figure 5:
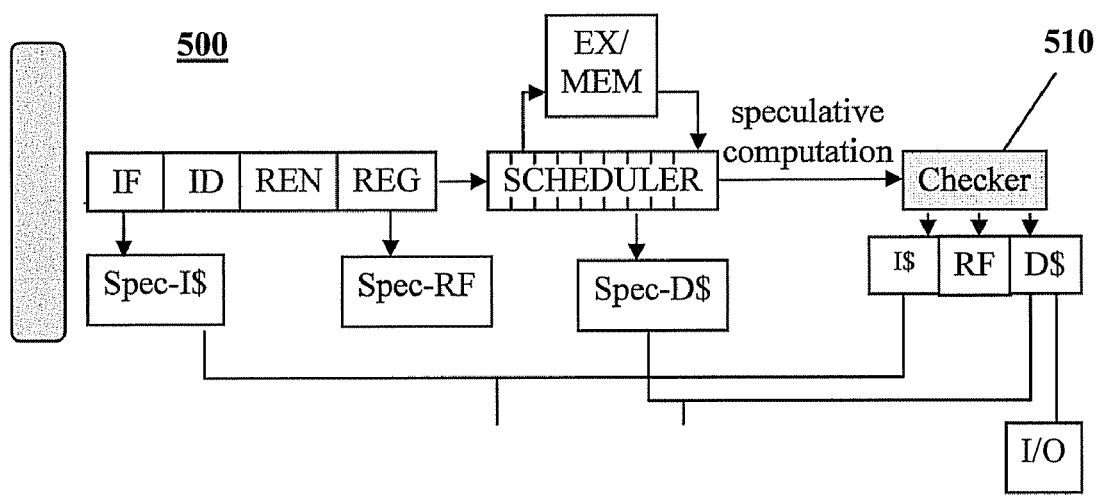
FIG. 5 shows a DIVA core processor and DIVA checker processor according to an embodiment of the present invention.

FIG. 5 shows a complex core processor and a simple checker processor according to an embodiment of the present invention. A Complex Core Processor 500 is a simplified block diagram of a traditional processor. A checker 510 is added to verify whether the traditional processor's result, which may have an error, is same as the checker's result. In the prior art, the checker may be a complex checker processor as described in the DIVA architecture. The DIVA checker may check each of the instruction results before retirement resulting in high fault tolerance. In embodiments of the present invention, the checker 510 may be simpler than the DIVA checker and may be capable of providing at least some of the functionality provided by the DIVA checker as described above. If the result of the processor or ALU is verified by the checker 510, the result may be committed and/or the operation of the processor may be retired. The result may then be available outside of the processor core through I/O (input/output), i.e. the world visible to the programmer.

Figure 6:
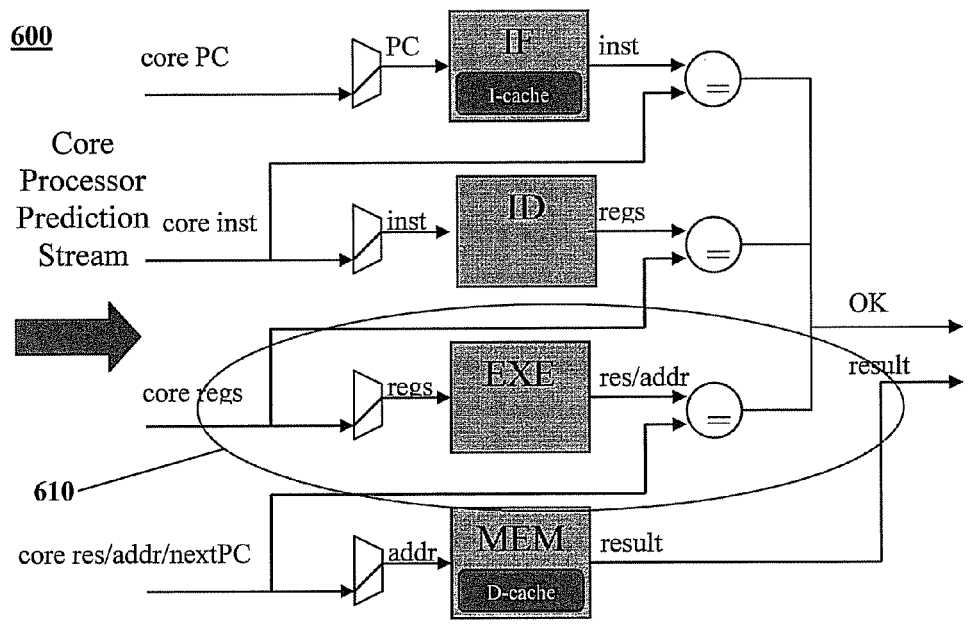
FIG. 6 shows the EXE pathway of the DIVA checker according to an embodiment of the present invention.

FIG. 6 shows the EXE pathway of the DIVA checker according to an embodiment of the present invention. FIG. 6 shows more microarchitectural detail of the DIVA checker 600, which performs dynamic verification. The EXE portion 610 of the DIVA checker logic is circled. The EXE unit, which is redundant to the complex core processor's EXE unit, checks that the checker's computed arithmetic/logic result is equal to the core processor's result before the processor's result gets committed and becomes available to external world. It should be noted, that embodiments of the present invention are meant to replace at least some of the functionality provided by the EXE portion of the DIVA checker such as ALU operations.

The checker may be part of a processing system. The processing system may include a processor and may also include a separate device operatively connected to the processor. The checker may thus be part of the processor or the separate device operatively connected to the main processor. Similarly, the checker may be implemented by the processor, or may be implemented by a separate device operatively connected to the main processor. The checker may be implemented in hardware, software, or in a combination of both hardware and software. Instructions for a processor may be stored on a storage device such that when the processor executes the instructions it results in the execution of the operations of the checker. The checker may replace at least some of the functionality provided by the DIVA checker but the checker is by no means limited to the DIVA architecture. The checker is useful as part of or in connection with any processor, microprocessor, controller, microcontroller, FPGA, CPLD, or the like which requires runtime verification. The checker may not require carry propagation thereby allowing all bit operations may be done easily and in parallel. Thus, the checker may be cheaper, more efficient, and less complex than the processor or ALU.

What is claimed is:

1. A method, comprising:
   forming, by a checker device that includes hardware, a first binary number, wherein said first binary number is a bit-wise complement of a proposed sum of a first addend and a second addend, wherein said proposed sum, said first addend, and said second addend are two's complement numbers;
   determining, by said checker device, whether a checker sum of said first addend, said second addend, and said first binary number equals negative one in two's complement;
   retiring, by said checker device, an operation in a processor which resulted in said proposed sum if said checker sum is equal to negative one in two's complement, wherein said operation includes multiplication or division; and
   raising, by said checker device, an exception if said checker sum is not equal to negative one in two's complement.

2. The method of claim 1, wherein said determining includes:
   forming a second binary number, wherein each bit of said second binary number is the least significant bit of the sum of the corresponding bits of said first addend, said second addend, and said first binary number; and
   forming a third binary number, wherein each bit of said third binary number is the most significant bit of the sum of the corresponding bits of said first addend, said second addend, and said first binary number, and
   wherein said checker sum is equal to negative one in two's complement if the least significant bit of said second binary number is '1' and each bit of said third binary number does not equal the corresponding next most significant bit of said second binary number.

3. The method of claim 1, wherein said determining includes:
   adding said first addend, said second addend, and said first binary number to form said checker sum; and
   comparing said checker sum to negative one in two's complement.

4. The method of claim 1, wherein said operation further includes addition.

5. The method of claim 1, wherein said operation further includes subtraction.

6. The method of claim 1, wherein said checker device includes a checker processor configured to execute computer-readable instructions stored on a non-transitory computer-readable instructions to perform said forming, determining, retiring, and raising.

7. An apparatus, comprising:
   bit-wise complement logic to form a first binary number, wherein said first binary number is a bit-wise complement of a proposed sum of a first addend and a second addend, wherein said proposed sum, said first addend, and said second addend are two's complement numbers;
   determination logic to determine whether a checker sum of said first addend, said second addend, and said first binary number equals negative one in two's complement;
   commit logic to retire an operation in a processor which resulted in said proposed two's complement sum if said checker sum is equal to negative one in two's complement, wherein said operation includes multiplication or division; and
   exception logic to raise an exception if said checker sum is not equal to negative one in two's complement.

8. The apparatus of claim 7, wherein said determination logic includes:
   a first single-bit adder to form a second binary number, wherein each bit of said second binary number is the least significant bit of the sum of the corresponding bits of said first addend, said second addend, and said first binary number; and
   a second single-bit adder to form a third binary number, wherein each bit of said third binary number is the most significant bit of the sum of the corresponding bits of said first addend, said second addend, and said first binary number, and wherein said checker sum is equal to negative one in two's complement if the least significant bit of said second binary number is '1' and each bit of said third binary number does not equal the corresponding next most significant bit of said second binary number.

9. The apparatus of claim 7, wherein said determination logic includes:

an adder to add said first addend, said second addend, and said first binary number to form said checker sum; and said determination logic to compare said checker sum to negative one in two's complement.

10. The apparatus of claim 7, wherein said operation further includes addition.

11. The apparatus of claim 7, wherein said operation further includes subtraction.

12. An article of manufacture, comprising:

a non-transitory computer-readable medium having instructions stored thereon that, if executed by a checker processor, cause the checker processor to perform operations that include:

forming, by a checker device that includes hardware, a first binary number, wherein said first binary number is a bit-wise complement of a proposed sum of a first addend and a second addend, wherein said proposed sum, said first addend, and said second addend are two's complement numbers;

determining, by said checker device, whether a checker sum of said first addend, said second addend, and said first binary number equals negative one in two's complement;

retiring, by said checker device, an operation in a processor which resulted in said proposed sum if said checker sum is equal to negative one in two's complement, wherein said operation includes multiplication or division; and raising, by said checker device, an exception if said checker sum is not equal to negative one in two's complement.

13. The article of manufacture of claim 12, wherein said determining includes:

forming a second binary number, wherein each bit of said second binary number is the least significant bit of the sum of the corresponding bits of said first addend, said second addend, and said first binary number; and forming a third binary number, wherein each bit of said third binary number is the most significant bit of the sum of the corresponding bits of said first addend, said second addend, and said first binary number, and wherein said checker sum is equal to negative one in two's complement if the least significant bit of said second binary number is '1' and each bit of said third binary number does not equal the corresponding next most significant bit of said second binary number.

14. The article of manufacture of claim 12, wherein said determining includes:

adding said first addend, said second addend, and said first binary number to form said checker sum; and comparing said checker sum to negative one in two's complement.

15. The article of manufacture of claim 12, wherein said operation further includes addition.

16. The article of manufacture of claim 12, wherein said operation further includes subtraction.

* * * * *